United States Patent [19]

Bauer

[11] Patent Number: 5,676,397
[45] Date of Patent: Oct. 14, 1997

[54] SEAT BELT PRETENSIONER INCLUDING FLEXIBLE STRAP

[75] Inventor: Barney J. Bauer, Fenton, Mich.

[73] Assignee: TRW Vehicle Safety Systems Inc., Lyndhurst, Ohio

[21] Appl. No.: 539,627

[22] Filed: Oct. 5, 1995

[51] Int. Cl.[6] .................................................. B60R 22/46
[52] U.S. Cl. .............................................. 280/806; 297/480
[58] Field of Search .................................. 280/806, 805, 280/807; 297/480, 470, 471, 472

[56] References Cited

U.S. PATENT DOCUMENTS

| | | | |
|---|---|---|---|
| 4,232,886 | 11/1980 | Tsuge et al. | 280/806 |
| 4,258,934 | 3/1981 | Tsuge et al. | 280/806 |
| 4,385,775 | 5/1983 | Shimogawa et al. | 280/806 |
| 5,310,219 | 5/1994 | Fohl | 280/806 |
| 5,310,220 | 5/1994 | Fohl | 280/806 |
| 5,358,275 | 10/1994 | Fohl | 280/806 |

FOREIGN PATENT DOCUMENTS

| | | | |
|---|---|---|---|
| 149131 | 11/1979 | Japan | 280/806 |
| 1800770 | 1/1994 | U.S.S.R. | 280/806 |

*Primary Examiner*—Paul N. Dickson
*Attorney, Agent, or Firm*—Tarolli, Sundheim, Covell, Tummino & Szabo

[57] ABSTRACT

An apparatus (40, 460) for tensioning a seat belt and tightening the seat belt against an occupant. The apparatus comprises a housing (42, 462) connectable to a component of a vehicle. A flexible member (102, 482) has a first end portion (104, 484) fixed against movement relative to the housing (42, 462). A second end portion (120, 500) of the flexible member (102, 482) is connectable with a seat belt. An intermediate portion (142, 502) of the flexible member (102, 482) is located between the first and second end portions (104, 120, 484, 500). A part (144, 504) of the intermediate portion (142, 502) is located in the housing (42, 462) and defines an expansible chamber (162, 518). An actuator (202, 562), upon actuation, creates a force which acts on the part (144, 504) of the intermediate portion (144, 502) to expand the chamber (162, 518) and move the second end portion (120, 500) of the flexible member (102, 484) in a direction to tension the seat belt and tighten the seat belt against the occupant.

16 Claims, 4 Drawing Sheets

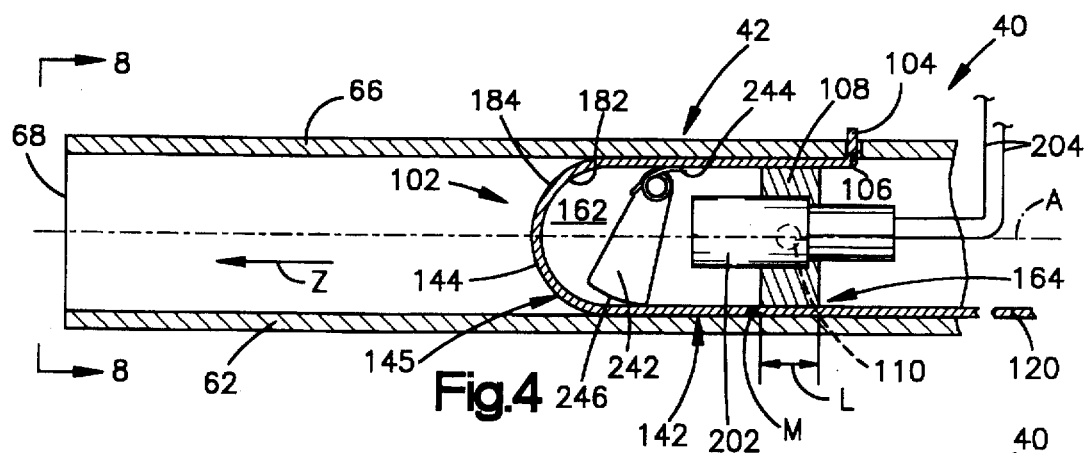
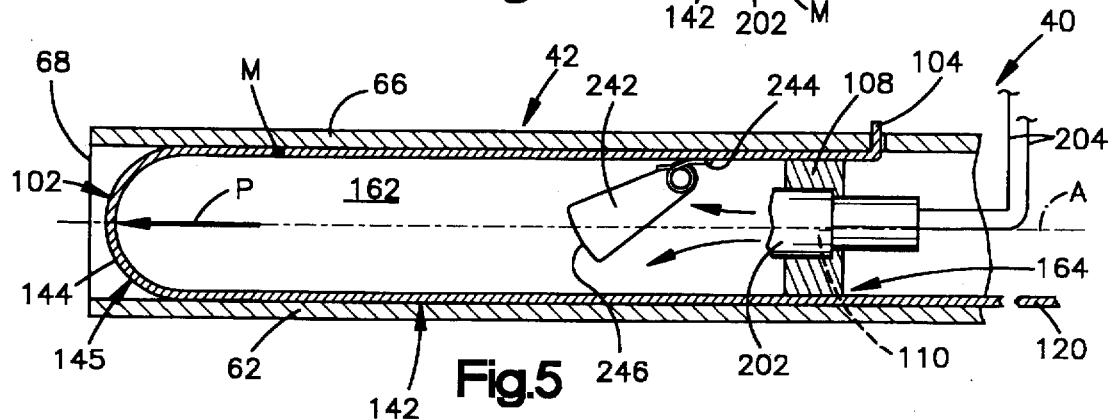
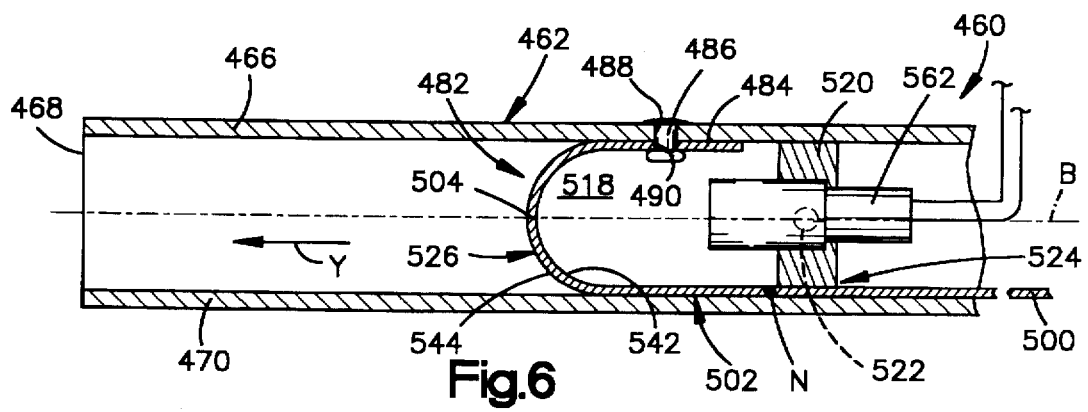
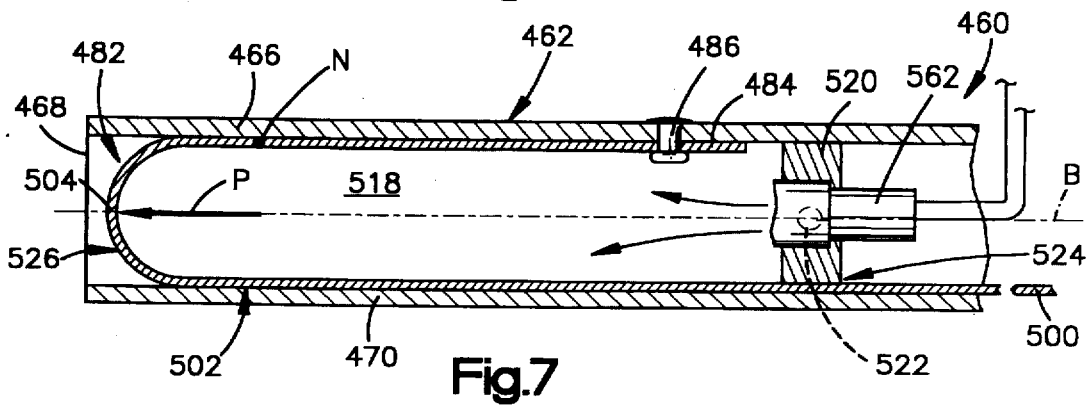

SEAT BELT PRETENSIONER INCLUDING FLEXIBLE STRAP

BACKGROUND OF THE INVENTION

1. Technical Field

The present invention relates to a pretensioner for tensioning a seat belt and tightening the seat belt against a vehicle occupant.

2. Description of the Prior Art

Pretensioners for seat belts are known. A known pretensioner is actuatable to tension the seat belt and tighten the seat belt against a vehicle occupant. One known pretensioner is attached to a seat belt buckle which is connectable with a tongue carried by the seat belt. Upon actuation, the pretensioner moves the buckle to tension the seat belt and tighten the seat belt against a vehicle occupant.

The known pretensioner includes a cylinder and a movable piston located in the cylinder. The piston is fixed to a first end of a cable. A second end of the cable is fixed to the seat belt buckle. A pyrotechnic cartridge is associated with the cylinder. Upon actuation of the pyrotechnic cartridge, the piston moves in the cylinder to pull the first end of the cable. The second end of the cable pulls the buckle to tension the seat belt and tighten the seat belt against the vehicle occupant.

SUMMARY OF THE INVENTION

The present invention is directed to a pretensioner for a seat belt in which the pretensioner tensions the seat belt and tightens the seat belt against a vehicle occupant. The pretensioner comprises a housing connectable to a component of a vehicle. A flexible member has a first end portion fixed against movement relative to the housing. A second end portion of the flexible member is connectable with a seat belt and is movable in a direction to tension the seat belt and tighten the seat belt against a vehicle occupant.

An intermediate portion of the flexible member is located between the end portions. An expansible chamber is defined at least partially by the housing and a part of the intermediate portion of the flexible member located in the housing. Actuatable means is in fluid communication with the expansible chamber for creating, upon actuation, a pressure force which acts on the part of the intermediate portion to expand the expansible chamber and move the second end portion of the flexible member in the direction to tension the seat belt and tighten the seat belt against the vehicle occupant.

The intermediate portion of the flexible member has a U-shaped section. The pressure force acts on the U-shaped section to expand the chamber. The expansible chamber is partially closed at an end of the housing opposite the U-shaped section. The housing has a slot at the closed end and the flexible member extends through the slot for connection with the seat belt.

The flexible member is in the form of a strap and has a pair of generally parallel major side surfaces interconnected by a pair of minor side surfaces. The housing is rectangular and the minor side surfaces of the flexible member cooperate with walls of the housing which define the expansible chamber to inhibit fluid leakage between the flexible member and the housing.

BRIEF DESCRIPTION OF THE DRAWINGS

Further features and advantages of the present invention will become apparent to those skilled in the art to which the present invention relates from reading the following specification with reference to the accompanying drawings, in which:

FIG. 3 is a schematic perspective view of another seat belt buckle assembly having a pretensioner according to another embodiment of the present invention;

FIG. 4 is a sectional view of a portion of the pretensioner of FIGS. 1 and 2;

FIG. 5 is a view similar to FIG. 4 with parts illustrated in different positions;

FIG. 6 is a sectional view of a portion of the pretensioner of FIG. 3;

FIG. 7 is a view similar to FIG. 6 with parts illustrated in different positions;

DESCRIPTION OF PREFERRED EMBODIMENTS

Figure 1:
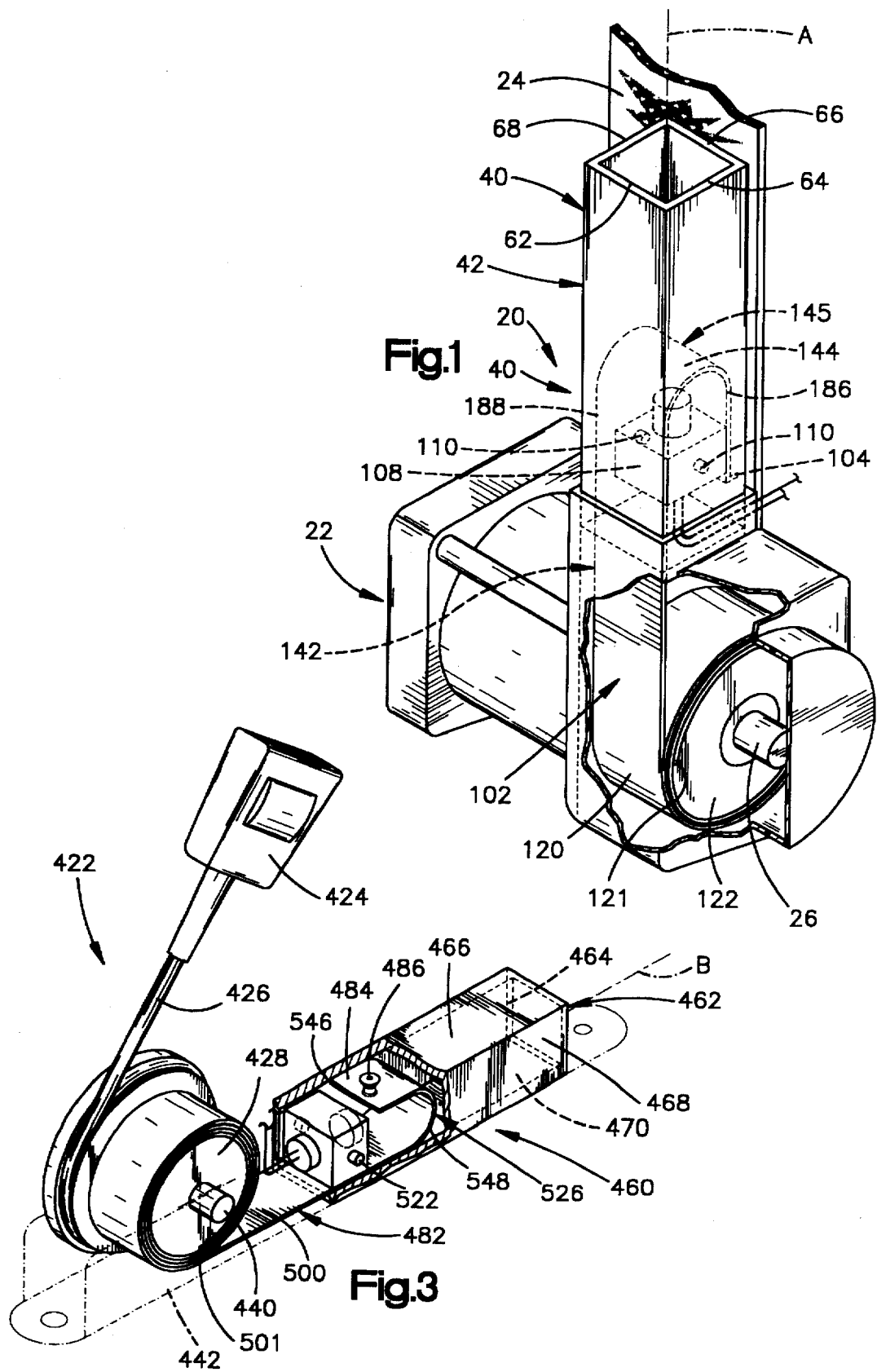
FIG. 1 is a schematic perspective view of a seat belt retractor assembly having a pretensioner according to one embodiment of the present invention.

A vehicle occupant restraint system includes a seat belt retractor assembly 20 (FIG. 1) having a retractor 22 and seat belt webbing 24. The retractor 22 is attachable to a component of a vehicle such as a seat, floor, door pillar or door. The seat belt webbing 24 is extendable around a seated occupant of the vehicle. A metal tongue (not shown) is carried by the seat belt webbing 24 and is connectable with a buckle (not shown) of the occupant restraint system. The retractor 22 includes a spool (not shown) for storing the seat belt webbing 24. The spool is supported on a shaft 26 for rotation in opposite directions for withdrawal and retraction of the seat belt webbing 24.

The seat belt retractor assembly 20 also includes a pretensioner 40, according to one embodiment of the present invention. The pretensioner 40 is actuatable to tension the seat belt webbing 24 and tighten the seat belt webbing against a user of the restraint system.

Figure 8:
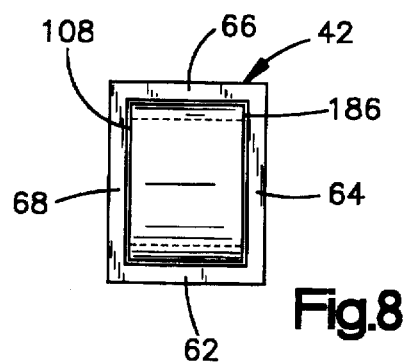
FIG. 8 is an end view of the pretensioner of FIG. 4, taken along the line 8—8 in FIG. 4.

The pretensioner 40 includes a metal tubular housing 42 which is attached to the retractor 22. The housing 42 has a longitudinal central axis A. The housing 42 also has four walls 62, 64, 66, 68 which cooperate to define a rectangular shaped tube, as illustrated in FIG. 8. Preferably the housing 42 has a square inner periphery when viewed in a direction along the axis A of the housing 42.

The pretensioner 40 also includes a flexible strap member 102 made of a suitable material, such as metal. The flexible strap member 102 has a bent first end portion 104 attached to the housing 42 at the wall 66, as viewed in FIG. 4. The bent first end portion 104 of the flexible strap member 102 extends through an opening 106 in the upper wall 66 of the housing 42. A block 108 is fixed to the side walls 64, 68 of the housing 42 by suitable means, such as with a fastener or pin 110. The block 108 prevents the first end portion 104 of the flexible strap member 102 from being removed from the opening 106 in the wall 66 by preventing downward movement, as viewed in FIG. 4, of the first end portion relative to the wall.

Figure 9:
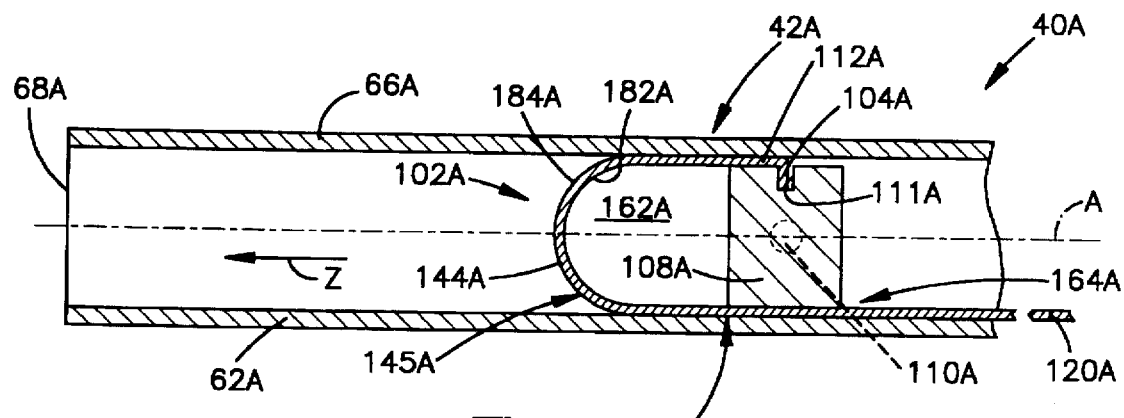
FIG. 9 is a sectional view of an alternate mounting of components of the pretensioner.
Figure 10:
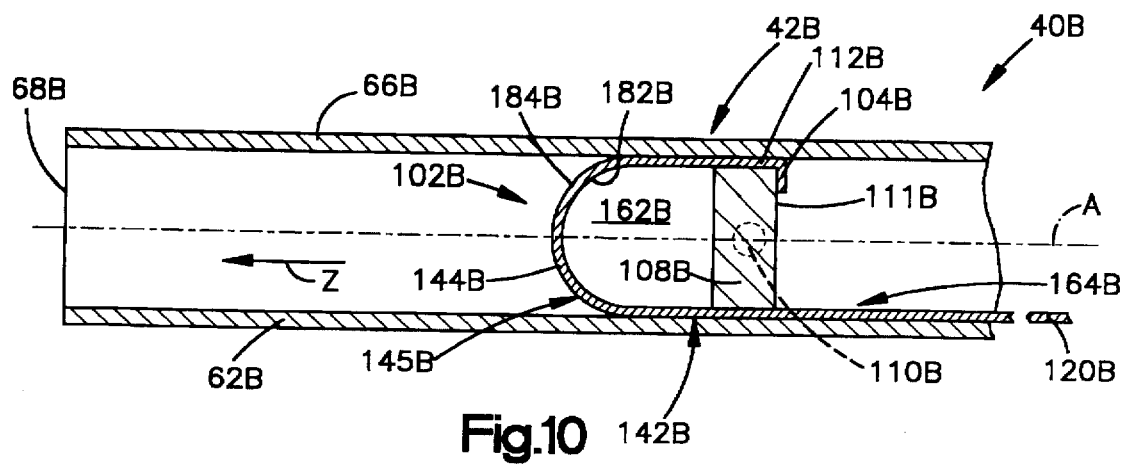
FIG. 10 is a view similar to FIG. 9 of another alternate mounting of components of the pretensioner.

Alternate mechanisms for attaching the flexible strap member 102A or 102B to the housing 42A or 42B are illustrated in FIGS. 9 and 10. The block 108A (FIG. 9) includes a groove 111A adjacent the upper wall 66A of the housing 42A. The bent first end portion 104A of the flexible strap member 102A is located in the groove 111A in the block 108A. A part 112A of the flexible strap member 102A is trapped between the block 108A and the upper wall 66A of the housing 42A. Thus, the first end portion 104A is restrained from moving in a direction parallel to and transverse to the axis A.

The block 108B (FIG. 10) includes an end surface 111B. The bent first end portion 104B of the flexible strap member 102B engages the end surface 111B of the block 108B. A part 112B of the flexible strap member 102B is trapped between the block 108B and the upper wall 66B of the housing 42B. Thus, the first end portion 104B is restrained from moving in a direction parallel to and transverse to the axis A.

A second end portion 120 of the flexible strap member 102 is located outside of the housing 42. In the embodiment illustrated in FIG. 1, an end 121 of the second end portion 120 of the flexible strap member 102 is attached to a pulley 122 which is supported for rotation in the retractor 22. A clutch mechanism (not shown) of a known construction is located within the pulley 122. The clutch mechanism, when unactuated, allows the spool of the retractor to rotate relative to the pulley 122. The clutch mechanism is actuated in response to actuation of the pretensioner 40. When the clutch mechanism is actuated, the spool of the retractor 22 is mechanically connected with the pulley 122.

When the pretensioner 40 is actuated, the second end portion 120 of the flexible strap member 102 is moved upward, as viewed in FIG. 1. This upward movement of the end portion 120 of the flexible strap member 102 rotates the end 121 of the flexible strap member, the pulley 122, the clutch, the shaft 26 and the spool of the retractor 22 in a belt retraction direction. Rotation of the spool in the belt retraction direction shortens the length of seat belt webbing 24 extending from the retractor, tensions the seat belt webbing, and tightens the seat belt webbing against a seated vehicle occupant using the restraint system.

The flexible strap member 102 also includes an intermediate portion 142 which is located between the first end portion 104 and the second end portion 120. A part 144 of the intermediate portion 142 of the flexible strap member 102 is located inside of the housing 42. The part 144 of the intermediate portion 142 of the flexible strap member 102 cooperates with the two walls 64 and 68 of the housing 42 to define an expansible chamber 162.

The part 144 of the intermediate portion 142 located in the housing 42, as viewed in FIG. 4, includes a U-shaped section 145 defining the left end of the chamber 162. The U-shaped section 145 moves from the position illustrated in FIG. 4 in a direction Z to the left to the position illustrated in FIG. 5 during expansion of the chamber 162. During expansion of the chamber 162, a specific part M of the intermediate portion 142 of the flexible strap member 102 is moved from a location between the lower wall 62 of the housing 42 and the block 108, as illustrated in FIG. 4, to a location against the upper wall 66, as illustrated in FIG. 5.

The flexible strap member 102 also includes a pair of parallel extending major side surfaces 182, 184 (FIGS. 4 and 5). The major side surfaces 182, 184 are interconnected by a pair of parallel extending minor side surfaces 186, 188. The minor side surfaces 186, 188 of the flexible strap member 102 cooperate with the side walls 64, 68 of the housing 42 to inhibit fluid flow between the flexible strap member and the housing to define the chamber 162. The width of the flexible strap member 102, defined by the distance between the minor side surfaces 186, 188, fits tightly between the side walls 64, 68 so relatively little fluid flow or leakage may occur between the housing 42 and the flexible strap member. An optional lubricant, such as grease, may be provided in the housing 42. The lubricant reduces friction during movement of the flexible strap member 102 relative to the housing 42 and further inhibits leakage between the flexible strap member and the housing.

The block 108 is located to the right in the expansible chamber 162, as viewed in FIGS. 4 and 5, which is axially opposite the U-shaped section 145. The block 108 defines an immovable right end of the expansible chamber 162. The block 108 also cooperates with the wall 62 of the housing 42 to define a slot 164 through which the intermediate portion 142 of the flexible strap member 102 extends. The intermediate portion 142 of the flexible strap member 102 fits tightly within the slot 164 so relatively little fluid flow or leakage occurs through the slot.

An actuatable pyrotechnic cartridge 202 is supported by the block 108 and is electrically connected by wires 204 to a controller (not shown). Upon actuation, the pyrotechnic cartridge 202 produces combustion products which pressurize the chamber 162 and apply a pressure force P to all of the surfaces defining the chamber. The lower and upper walls 62, 66 of the housing 42 limit movement of the intermediate portion 142 of the flexible strap member 102 in transverse outward directions relative to the axis A. The U-shaped section 145 of the intermediate portion 142 can thus move only in the direction Z along the axis A during expansion of the chamber 162. The pressure force P (FIG. 5) acts on the U-shaped section 145 to move the U-shaped section to the left to expand the chamber 162, from the position illustrated in FIG. 4 to the position illustrated in FIG. 5.

During this movement of the U-shaped section 145, the part 144 of the intermediate portion 142 continuously increases in length as the flexible strap member 102 is drawn into the housing 42 through the slot 164. The slot 164 guides the flexible strap member 102 as the flexible strap member moves along the wall 62 of the housing 42 during expansion of the chamber 162. The walls 62 and 66, respectively, of the housing 42 support and restrain upper and lower legs of the flexible strap member 102 during expansion of the chamber 162.

As the flexible strap member 102 is drawn into the housing 42, the upper and lower legs of the flexible strap member 102 lengthen simultaneously and by equal lengths. Thus the second end portion 120 of the flexible strap member 102 moves twice the distance that the U-shaped section 145 moves.

Expansion of the chamber 162 causes the second end portion 120 of the flexible strap member 102 to move in a direction to the left, as viewed in FIGS. 4 and 5. Movement of the second end portion 120 to the left rotates the end 121 of the flexible strap member 102, pulley 122, shaft 26 and spool in a belt retraction direction to shorten the length of the seat belt webbing 24 extending from the spool, tension the seat belt webbing and tighten the seat belt webbing against the occupant.

The pretensioner 40 may also include a pivoting swing member 242 which is biased by a spring 244 to pivot in a counterclockwise direction, as viewed in FIGS. 4 and 5. The swing member 242 inhibits contraction of the expansible chamber 162. The swing member 242 has a surface 246 which is urged by the spring 244 to engage and clamp the intermediate portion 142 of the flexible strap member 102 against the wall 62 of the housing 42. This clamping action inhibits the flexible strap member 102 from moving to the right relative to the housing 42. As illustrated in FIG. 5, the swing member 242 is free to pivot away from engagement with the flexible strap member 102 during expansion of the chamber 162 by the combustion products of the pyrotechnic cartridge 202 acting on the swing member. Also, friction of the flexible strap member 102 moving to the left acts on the swing member 242 and tends to pivot the swing member in a clockwise direction away from the clamping position. Thus, the swing member 242 does not inhibit expansion of the chamber 162.

Figure 2:
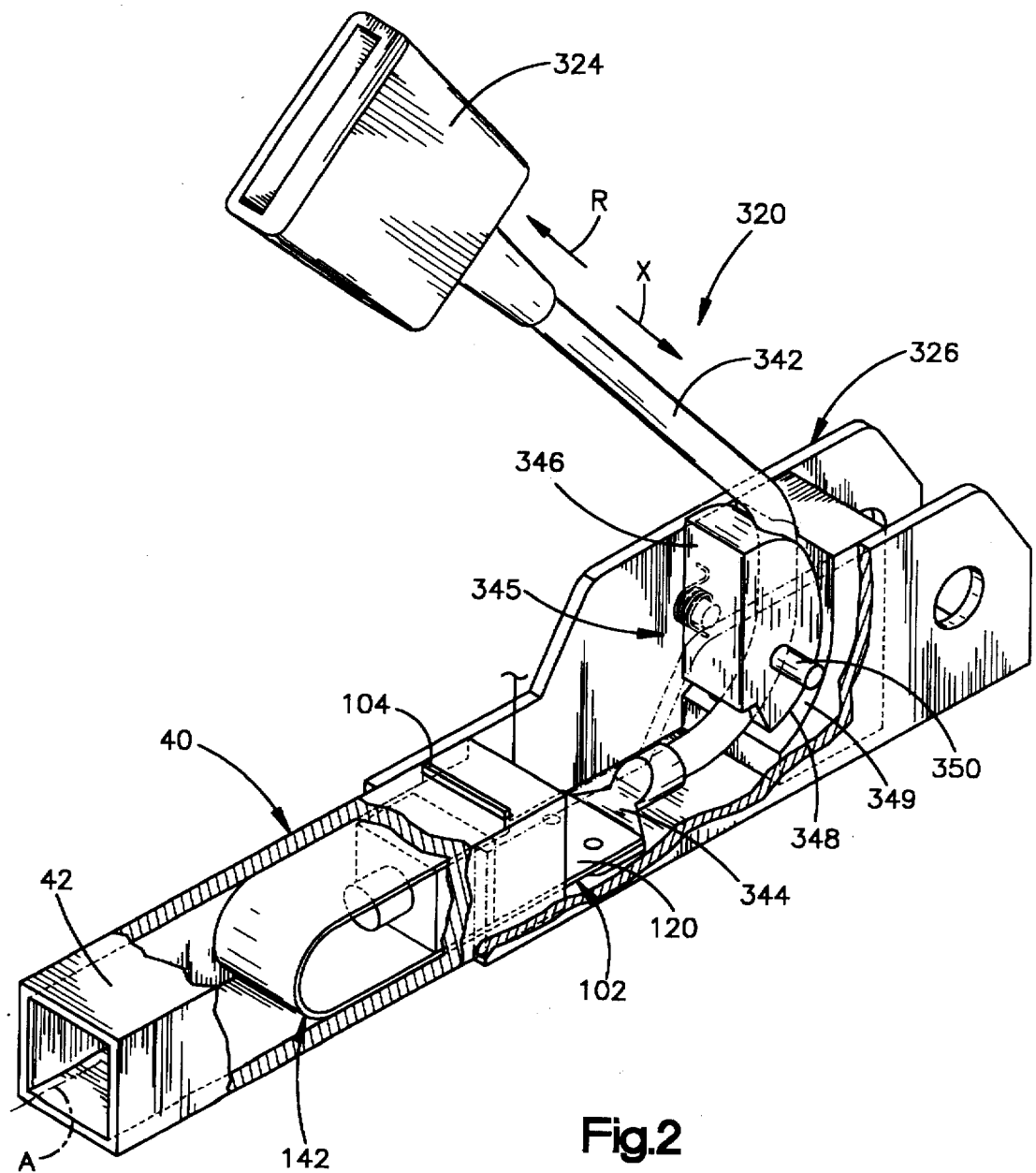
FIG. 2 is a schematic perspective view of a seat belt buckle assembly having a pretensioner constructed according the embodiment illustrated in FIG. 1.

Another application of the pretensioner 40 is illustrated in FIG. 2 in an occupant restraint system which includes a buckle assembly 320. The buckle assembly 320 includes a buckle 324 that is connectable with seat belt webbing (not shown) extending around a seated occupant of a vehicle. The buckle 324 is fixed to one end of a flexible member, such as a cable 342. The other end of the cable 342 has a connector 344 fixed to the second end portion 120 of the flexible strap member 102 in the pretensioner 40. Between its ends, the cable 342 is directed around an anti-pullback mechanism 345. The anti-pullback mechanism 345 includes a spring biased pivoting member 346 with an inner curved surface 348. The buckle assembly 320 also includes a mounting 326 which is connectable to a component of the vehicle, such as a seat, seat adjuster, floor, door pillar or door. The mounting 326 supports the housing 42 of the pretensioner 40 and the cable 342. The pivoting member 346 is supported on the mounting 326 by a shaft 350.

The buckle 324 and cable 342 freely move in a seat belt tightening direction X during expansion of the chamber 162. The inner curved surface 348 engages a portion of the cable 342 to clamp the cable against a fixed outer curved surface 349 in the mounting 326, when a force is applied to the buckle 324 which attempts to move the buckle and the upper part of the cable in a seat belt loosening direction R. This clamping of the cable 342 resists movement of the buckle 324 in the seat belt loosening direction R and contraction of the chamber 162.

The pretensioner 40 in the buckle assembly 320 is actuatable to tension the seat belt webbing and tighten the seat belt webbing against an occupant. The pretensioner 40 is actuated in response to the occurrence of an event requiring tensioning and tightening of the seat belt. The pretensioner 40, upon actuation, moves the second end portion 120 of the flexible strap member 102 to pull the connector 344 of the cable 342 in a direction towards the lower left, as viewed in FIG. 2. Movement of the connector 344 of the cable 342 in this direction pulls the buckle 324 in the seat belt tightening direction X to pretension the seat belt.

Another occupant restraint system includes a buckle assembly 422 (FIG. 3) that is connectable with seat belt webbing extending around a seated occupant of a vehicle. The buckle assembly 422 includes buckle 424 which is fixed to one end of a cable 426. Another end of the cable 426 is fixed to a pulley 428 supported on a shaft 440 for rotation. The shaft 440 is supported in a mounting 442 which is connectable to a component of the vehicle, such as a seat, floor, door pillar or door.

The buckle assembly 422 includes a pretensioner 460 (FIGS. 3, 6 and 7), according to another embodiment of the present invention. The pretensioner 460 is fixed to the mounting 442. The pretensioner 460 is actuatable to tension the seat belt webbing and tighten the seat belt webbing against an occupant in response to an event requiring tensioning and tightening of the seat belt.

The pretensioner 460 includes a metal housing 462. The housing 462 has four walls 464, 466, 468, 470 which cooperate to define the housing as rectangular tube. Preferably, the housing 462 has a square inner periphery viewed in a direction along a longitudinal central axis B of the housing.

The pretensioner 460 also includes a metal flexible strap member 482. The flexible strap member 482 has a first end portion 484 which is attached to the housing 462 at the wall 466, as viewed in FIGS. 3 and 6, by a suitable fastener such as a rivet 486. The rivet 486 extends through an opening 488 (FIG. 6) in the wall 466 and through an opening 490 in the first end portion 484. It will be apparent that any suitable fastener can be used to attach the first end portion 484 of the flexible strap member 482 to the housing 462 or that the first end portion could be attached to the housing as illustrated in FIGS. 4, 9 or 10.

A second end portion 500 of the flexible strap member 482 is located outside of the housing 462 and is movable in a direction to effect tensioning and tightening of the seat belt. An end 501 of the second end portion 500 is attached to a portion of the pulley 428 which is offset from the cable 426 along the shaft 440. The flexible strap member 482 includes an intermediate portion 502 which is located between the first and second end portions 484, 500. A part 504 of the intermediate portion 502 is located inside of the housing 462. When the pretensioner 460 is actuated, the second end portion 500 of the flexible strap member 482 is pulled to rotate the end 501 and the pulley 428 in a direction to tension and tighten the seat belt against an occupant of the vehicle.

A block 520 (FIGS. 6 and 7) is fixed to the walls 464, 468 of the housing 462 by a suitable fastener 522. The block 520 substantially closes the right end of the housing 462, as viewed in FIGS. 6 and 7. The block 520 also cooperates with the wall 470 of the housing 462 to define a slot 524. The intermediate portion 502 of the flexible strap member 482 extends through the slot 524. The slot 524 guides an axial length of the intermediate portion to keep the intermediate portion against the wall 470 of the housing 462.

The intermediate portion 502 of the flexible strap member 482 cooperates with the walls 464 and 468 of the housing 462 to define an expansible chamber 518. The walls 466 and 470 of the housing 462 support and restrain the intermediate portion 502 of the flexible strap member 482. The part 504 of the intermediate portion 502 of the flexible strap member 484 defines a movable U-shaped section 526. The U-shaped section 526 moves to the left within the housing 462 as the chamber 518 expands. The U-shaped section 526 moves from the position illustrated in FIG. 6 in a direction Y to the left to the position illustrated in FIG. 7 during expansion of the chamber 518. During expansion of the chamber 518, a specific part N of the intermediate portion 502 of the flexible strap member 482 is moved from a location between the lower wall of the housing 462 and the block 520, as illustrated in FIG. 6, to a location against the upper wall of the housing, as illustrated in FIG. 7.

The flexible strap member 482 includes a pair of parallel major side surfaces 542, 544, (FIGS. 6 and 7). The major side surfaces 542, 544 are interconnected by a pair of parallel minor side surfaces 546, 548 (FIG. 3). The minor side surfaces 546, 548 of the flexible strap member 482 cooperate with the walls 464, 468 of the housing 462 to inhibit fluid flow between the walls and the flexible strap member and thus to limit fluid leakage from the expansible chamber 518.

An actuatable pyrotechnic cartridge 562 is supported by the block 520 and is electrically connected to a controller (not shown). Upon actuation, the pyrotechnic cartridge 562 causes the expansible chamber 518 to expand and move the second end portion 500 of the flexible strap member 482 in the direction to the left, as viewed in FIGS. 6 and 7, to tension and tighten the seat belt against an occupant of the vehicle.

The pyrotechnic cartridge 562, upon actuation, produces combustion products. The combustion products flow from an end of the pyrotechnic cartridge 562 into the expansible chamber 518. A pressure force P of the combustion products in the chamber 518 drives the section 526 to the left, as viewed in FIGS. 6 and 7, to expand the chamber 518. The intermediate portion 502 of the flexible strap member 482 pulls the second end portion 500 to the left, as viewed in FIGS. 6 and 7, which rotates the end 501 of the flexible strap member and the pulley 428. The pulley 428 rotates in a counterclockwise direction, as viewed in FIG. 3, and rotates the end of the cable 426 which is fixed to the pulley. The cable 426 pulls the buckle 424 in a direction towards the mounting 442 to tension and tighten the seat belt.

From the above description of the invention, those skilled in the art will perceive improvements, changes and modifications. For example, the flexible strap members 102, 482 could have non-parallel side surfaces 182, 184, 186, 188, 542, 544, 546, 548. The major side surfaces 182, 184 and 542, 544 could taper slightly toward or away from each other without affecting the performance of the strap members 102, 482. The minor side surfaces 186, 188 and 546, 548 could be substantially out of parallel alignment, provided the walls of the housing 542 and 462 and the slots 164 and 524 are configured to provide the necessary fluid flow inhibiting seal. The flexible strap members 102, 482 could have an end portion formed into a cable-like member. The pyrotechnic cartridges 202, 562 could be replaced by a stored gas container for expanding the chambers 162, 518. The pyrotechnic cartridges 202, 562 or stored gas container could be mechanically actuated instead of electrically actuated. Such improvements, changes and modifications within the skill of the art are intended to be covered by the appended claims.

Having described the invention, the following is claimed:

1. An apparatus for tensioning a seat belt and tightening the seat belt against a vehicle occupant, said apparatus comprising:

a housing fixedly connectable to a component of a vehicle;

a flexible member comprising a first end portion fixed against movement relative to said housing, a second end portion connectable with the vehicle seat belt, and an intermediate portion between said first and second end portions, a part of said intermediate portion being located in said housing, said part cooperating with said housing to define an expansible chamber in said housing; and actuatable means for creating, upon actuation, a force acting on said part of said intermediate portion to expand said expansible chamber with respect to said housing and move said second end portion of said flexible member in a direction to tension the seat belt and tighten the seat belt against an occupant.

2. The apparatus of claim 1 wherein said part of said intermediate portion of said flexible member comprises a movable U-shaped section of the flexible member.

3. The apparatus of claim 2 wherein said housing further includes means for substantially closing the chamber at an end opposite said U-shaped section and for defining a slot adjacent a wall of said housing, said intermediate portion of said flexible member extending through the slot.

4. The apparatus of claim 1 wherein said flexible member comprises a pair of generally parallel major side surfaces interconnected by a pair of minor side surfaces.

5. The apparatus of claim 4 wherein said housing comprises a tube having a rectangular inner periphery taken in a plane extending normal to a longitudinal axis of said housing and said minor side surfaces of said flexible member cooperating with said inner periphery of said housing to inhibit fluid flow between said flexible member and said housing.

6. The apparatus of claim 5 wherein said first end portion of said flexible member extends through an opening in a wall of said housing to attach said flexible member to said housing.

7. The apparatus of claim 6 further including a block for inhibiting detachment of said first end portion from the opening in said housing wall.

8. The apparatus of claim 5 wherein said first end portion of said flexible member includes a first bent end part for engaging a portion of a support block fixed to said housing and a second part retained between said support block and said housing to attach said flexible member to said housing.

9. The apparatus of claim 1 further including means for inhibiting contraction of the chamber.

10. An apparatus for tensioning a seat belt and tightening the seat belt against a vehicle occupant, said apparatus comprising:

a tubular housing connectable to a component of a vehicle;

a block fixed to said housing and partially closing said housing, said block cooperating with said housing to define a slot adjacent a wall of said housing;

a flexible member comprising a first end portion fixed against movement relative to said housing, a second end portion connectable with the seat belt and an intermediate portion extending through the slot and located between said first and second end portions, a part of said intermediate portion being located in said housing and cooperating with said housing and said block to define an expansible chamber; and actuatable means for creating, upon actuation, a force which acts on said part of said intermediate portion to expand the chamber and move said second end portion of said flexible member in a direction to tension the seat belt and tighten the seat belt against an occupant.

11. The apparatus of claim 10 wherein said second end portion of said flexible member is operably connected with a seat belt retractor to effect retraction of the seat belt in response to expansion of the chamber.

12. The apparatus of claim 10 wherein said second end portion of said flexible member is fixed to a pulley operably connected to a buckle of the seat belt to rotate the pulley in a direction to tighten the seat belt.

13. The apparatus of claim 10 wherein said part of said intermediate portion of said flexible member comprises a movable U-shaped section.

14. The apparatus of claim 10 wherein said flexible member comprises a pair of generally parallel major side surfaces interconnected by a pair of minor side surfaces.

15. The apparatus of claim 14 wherein said housing has a rectangular inner periphery taken in a plane extending normal to a longitudinal axis of said housing and said minor side surfaces of said flexible member cooperate with said inner periphery of said housing to inhibit fluid flow between said flexible member and said housing.

16. The apparatus of claim 10 further including means for inhibiting contraction of the chamber.

* * * * *